2,998,096
OIL, GAS, AND WATER SEPARATOR
Rollie J. Snipes, Sapulpa, Okla., assignor to Gulf Oil Corporation, Pittsburgh, Pa., a corporation of Pennsylvania
Filed Oct. 28, 1958, Ser. No. 770,198
6 Claims. (Cl. 183—2.7)

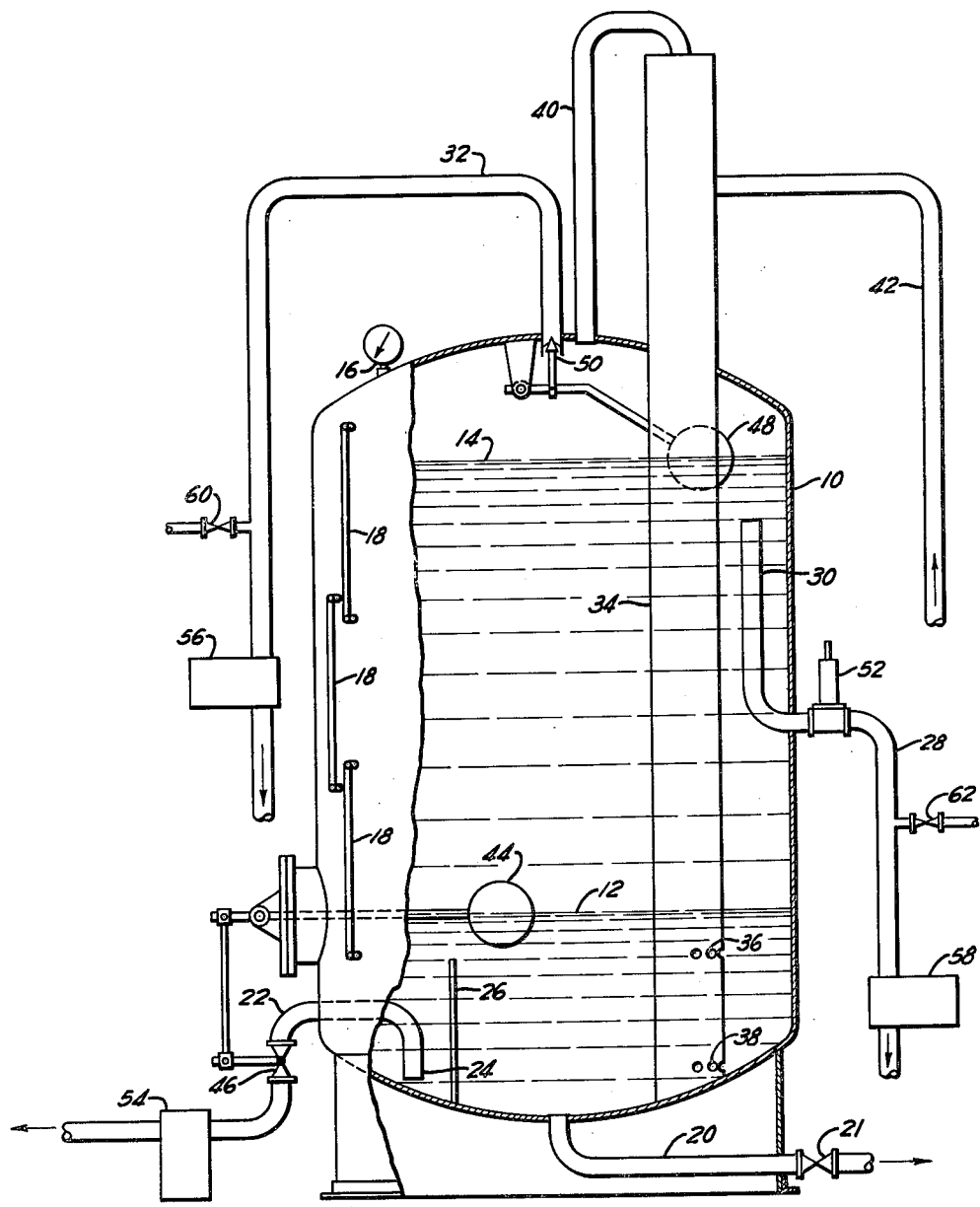

This invention relates to apparatus for testing oil wells and particularly to apparatus for separating the production from an oil well into separate streams of gas, oil, and water to allow separate measurement of the rate of flow of each of the fluids.

Frequently a three-phase mixture of oil, gas, and water is produced by an oil well. In order to test the well to determine its potential productivity, it is necessary to separate the production from the well into separate oil, gas, and water streams. The separate streams are then metered to determine the rate of production of each of the phases. It is desirable that a substantially continuous flow of the fluid streams be maintained to allow accurate measurement of the rates of flow.

In the well testing apparatus heretofore available, the production from the well is delivered into a vessel in which the three phases are separated and separate streams of each of the phases are withdrawn from the separator. A valve in the gas outlet line controls the pressure on the separator. Frequently the amount of gas produced by a well, particularly when the well is produced on pump, is not sufficient to permit effective control of the pressure by control of the rate of discharge of gas from the separator.

This invention resides in a well testing unit in which a pressure vessel equipped with separate oil, gas, and water outlet lines is used as a separator for separating gas, oil, and water. Separate float controlled valves in the water outlet and the gas outlet lines control flow through those lines and a back pressure valve in the oil line controls the pressure on the separator.

The single figure of the drawings illustrates the well testing apparatus of this invention showing the three phase separator partially in vertical section.

Referring to the drawing, the well testing apparatus of this invention is illustrated including a vertical cylindrical pressure vessel 10 closed at its top and bottom. During operation of the separator, an oil-water interface 12, referred to as the water level in the following description, is maintained in the lower portion of the vessel 10 and an oil-gas interface, referred to as the oil level 14, is maintained near the top of the vessel 10. Ordinarily the vessel 10 will be equipped with a pressure gauge 16, sight glasses 18, and a drain line 20 closed by a valve 21.

Opening from the side of the vessel 10 near its lower end is a water outlet line 22 which continues into the vessel 10 and opens downwardly at 24 near the bottom of the vessel. A baffle 26 extends upwardly from the bottom of the vessel 10 adjacent the open end 24 of water outlet line 22. The upper end of baffle 26 is slightly below the water level 12.

An oil outlet line 28 extends from the side of vessel 10 approximately midway between the top and bottom. A vertical arm 30 forms an extension of oil outlet line 28 in the vessel 10 opening upwardly slightly below the oil level 14. Thus, oil enters oil outlet line 28 at a location near the top of vessel 10 and between the water level 12 and oil level 14. A gas outlet line 32 from the upper end of the vessel 10 allows discharge of gas from the vessel.

In the vessel 10, remote from the opening 24 of the water outlet line, is a vertical tubular production boot 34 extending from the bottom of the vessel upwardly through the top of the vessel. The production boot 34 is perforated at 36 and 38 on its side opposite the water outlet line 22 below the water level 12 for discharge of liquids from the well being tested into the vessel 10. If desired, the production boot 34 can be supported in vessel 10 with the lower end of the production boot spaced from the bottom of the vessel to permit the liquids to be discharged from the lower end of the production boot below the water level 12. The upper end of the production boot 34 is connected with a gas inlet line 40 which opens through the top of the vessel 10 above the oil level 14. A production inlet line 42 from the well to be tested is connected into the production boot 34 above the top of the vessel 10.

A float 44 designed to remain at the oil-water interface is positioned in the vessel 10 and connected through suitable linkage to a float controlled water valve 46 in water outlet line 22. The linkage connecting the float 44 and valve 46 is such that downward movement of the float closes valve 46 to reduce the flow through water outlet line 22 and upward movement of the float opens the valve 46 to increase the flow through the water outlet line.

An oil level float 48 in the vessel 10 at the oil level is connected to an element of a diagrammatically illustrated valve 50 adapted to control flow through the gas outlet line 32. Downward movement of float 48 causes the valve 50 to open and increase the flow of gas through gas outlet line 32. Upward movement of the float 48 closes the valve 50 to reduce the flow through the gas outlet line.

Connected in the oil outlet line 28 is a back pressure valve 52 diagrammatically illustrated in the drawing adapted to maintain the desired pressure within the vessel 10. Any of the conventional types of pressure regulating valves can be used to control the back pressure.

Suitable metering devices illustrated as a water meter 54 in water outlet line 22, a gas meter 56 in gas outlet line 32, and an oil meter 58 in oil outlet line 28 are provided to allow measurement of the amount of each of the fluids produced during the test. The method of measuring the flow is not critical to this invention. For example, measurement of the water and oil can be accomplished by running those liquids into calibrated tanks and gauging the tanks. If desired, arrangements for sampling the oil and gas streams such as pet cocks 60 in gas outlet line 32 and 62 in oil line 28 can be provided.

In the operation of the apparatus of this invention, a three phase mixture of gas, oil, and water is delivered through line 42 into the production boot 34. The relatively large diameter of production boot 34 allows disengagement of most of the gas which then flows upward into gas inlet line 40 and through that line into the top of vessel 10. The oil and water mixture flows downwardly through the production boot and out of the lower end of the production boot through perforations 36 and 38 into the vessel 10. Because of the difference in gravity of the water and oil, the water is collected in the lower part of vessel 10 below water level 12 and the oil rises to occupy the central portion of the vessel.

As flow into the vessel 10 continues from line 42, float 44 operates valve 46 in water outlet line 22 to maintain the oil-water interface at the desired level. Flow of droplets of oil into water outlet line 22 is reduced to a minimum by the location of perforations 36 and 38 to direct the oil discharged from the production boot 34 away from the water outlet line and by baffle 22 between the production boot 34 and the open end 24 of the water outlet line.

Control of the oil level 14 in the vessel 10 is accomplished by cooperation of the back pressure valve 52 and the float operated valve 50. For example, if the oil level 14 should rise above the desired height, the float operated vale 50 closes to prevent oil entering the gas outlet line 32. Continued flow of production fluids into the vessel 10 will increase the pressure in the vessel, thereby causing valve 52 to open and increase the flow of oil from the vessel. The increased flow of oil will lower the level of the oil in the vessel to open valve 50. In actual operation at substantially constant flow rates into vessel 10, valve 50 will reach an intermediate position in balance with valve 52. If the pressure in the vessel 10 drops below the desired value, valve 52 closes to reduce the flow through the oil outlet line. The oil level will then rise which closes valve 50 and speeds an increase in the pressure in the vessel to the desired value.

The location of the back pressure valve in oil outlet line 28 allows the well testing apparatus of this invention to be used on both free flowing wells and wells on pump. If the well being tested is being pumped, the amount of gas produced is frequently very small. The volume of flow of the gas is not sufficient to allow quick correction of conditions deviating from those desired. Moreover, accurate control of the very low rates of flow of gas is extremely difficult, and under the conditions generally encountered in the field practically impossible. In contrast, control of pressure by a back pressure valve in the oil line allows both accurate control and rapid correction of conditions deviating from those desired.

I claim:

1. Well testing apparatus comprising a pressure vessel adapted to receive production from an oil well and separate it into a lower water phase, an intermediate oil phase and an upper gas phase, an inlet line opening into the pressure vessel for delivery of production from the well being tested into the pressure vessel, a water outlet line opening from the pressure vessel near the bottom thereof, a gas outlet line opening from the pressure vessel near the top thereof, an oil outlet line opening from the vessel between the water outlet and gas outlet lines, a valve in the water outlet line, first control means connected to the valve in the water outlet line to control the level of the water phase in the vessel at the desired height, a valve in the gas outlet line, control means independent of the first control means linked to the valve in the gas outlet line and actuated by the level of the oil-gas interface to control the flow of gas through the valve in the gas outlet line, and a back pressure valve in the oil line adapted to control the pressure on the vessel by control of the rate of flow of oil through the oil outlet line, said back pressure valve operating independently of the level of the oil-gas interface in the pressure vessel.

2. Apparatus as set forth in claim 1 characterized by metering means in each of the water outlet, gas outlet, and oil outlet lines for measurement of flow therethrough.

3. Well testing apparatus comprising a pressure vessel adapted to receive production from an oil well and separate it into a lower water phase, an intermediate oil phase, and an upper gas phase, a water outlet line opening from the vessel near the bottom thereof for discharge of water from the vessel, a gas outlet line opening from the vessel near the top thereof for discharge of gas from the vessel, an oil outlet line opening from the vessel at a position between the water outlet and gas outlet lines, a valve in the water outlet line, a first float mounted in the vessel and adapted to remain at the interface between the oil and water phases, means linking the first float with the valve in the water outlet line constructed and arranged to control the flow through the water outlet line to maintain the level of the water phase at the desired height, a valve in the gas outlet line, a second float adapted to remain at the interface between the gas and oil phases, means linking the second float with the valve in the gas outlet line whereby the valve is closed when the oil level rises above the desired height in the vessel, a back pressure valve in the oil outlet line adapted to maintain the desired pressure on the vessel, and means for introducing production from the well into the vessel.

4. Well testing apparatus comprising a pressure vessel adapted to receive production from an oil well and separate it into a lower water phase, an intermediate oil phase between the water level and the oil level near the top of the vessel and a gas phase above the oil phase, a water outlet line opening from the vessel near the bottom thereof, a gas outlet line opening from the vessel near the top thereof, an oil outlet line opening from the vessel between the water outlet line and the gas outlet line in position to discharge oil from the vessel, a valve in the water outlet line, a first float in the vessel adapted to remain at the interface between the oil and water phases, means linking the first float with the valve in the water outlet line to maintain the water level at the desired height in the vessel, a valve in the gas outlet line, a second float mounted in the vessel and adapted to remain at the interface between the oil and gas phases, means linking the second float and the valve in the gas outlet line to close the valve when the oil level rises, a back pressure valve in the oil outlet line adapted to regulate pressure on the vessel, a production inlet line opening into the vessel near the lower end thereof, a baffle extending upwardly from the bottom of the vessel between the production inlet line and the water outlet line, said baffle having its upper edge below the interface of the water and oil phases in the vessel.

5. Well testing apparatus comprising a pressure vessel adapted to separate production from an oil well into a lower water phase, an intermediate oil phase and an upper gas phase, a water outlet line opening from the vessel near the bottom thereof, a gas outlet line opening from the vessel near the top thereof, an oil outlet line opening from the vessel at a position in the oil phase in the vessel between the water outlet line and gas outlet line, a valve in the water outlet line for control of flow therethrough, a first float in the vessel adapted to remain at the interface between the oil and water phases connected to the valve in the water outlet line to maintain the interface between the oil and water phases at the desired height in the vessel, a second float mounted in the vessel adapted to float at the interface between the oil and gas phases therein, a valve in the gas outlet line, means connecting the valve in the gas outlet line and the second float whereby the valve in the gas outlet line is closed as the level of oil in the separator rises, a back pressure valve in the oil outlet line adapted to control pressure on the vessel, a vertical tubular production boot in the vessel opening at its lower end near the bottom of the vessel and extending through the top of the vessel, a gas inlet line extending from the upper end of the production boot through the top of the pressure vessel, and a production inlet line opening into the production boot.

6. Apparatus for testing an oil well comprising a pressure vessel adapted to separate production from a well into a lower water phase, an intermediate oil phase and an upper gas phase, a water outlet line opening from the vessel near the bottom thereof, a gas outlet line opening from the vessel near the top thereof, an oil outlet line opening from the vessel at a position in the oil phase in the vessel between the water outlet line and gas outlet line, a valve in the water outlet line for control of flow therethrough, a first float in the vessel adapted to remain at the interface between the oil and water phases connected to the valve in the water outlet line to maintain the interface between the oil and water phases at the desired height in the vessel, a second float mounted in the vessel adapted to float at the interface between the oil and gas phases therein, a valve in the gas outlet line, means connecting the valve in the gas outlet line and the second float whereby the valve in the gas outlet line is closed as the level of oil in the separator rises, a tubular arm connected to the oil outlet line and extending upwardly into the pressure vessel to a level below the interface of the gas and oil phases, said arm being open at its upper end, a back pressure valve in the oil outlet line adapted to control pressure on the vessel, a vertical tubular production boot in the vessel opening at its lower end near the bottom of the vessel and extending through the top of the vessel, a gas inlet line extending from the upper end of the production boot through the top of the pressure vessel, and a production inlet line opening into the production boot.

References Cited in the file of this patent

UNITED STATES PATENTS

| | | |
|---|---|---|
| 1,581,371 | Weisgerber | Apr. 20, 1926 |
| 2,734,593 | McKelvey et al. | Feb. 14, 1936 |
| 2,664,170 | Walker et al. | Dec. 29, 1953 |
| 2,701,620 | Crawford | Feb. 8, 1955 |
| 2,726,729 | Williams | Dec. 13, 1955 |
| 2,753,046 | Williams | July 3, 1956 |
| 2,773,556 | Meyers et al. | Dec. 11, 1956 |
| 2,861,647 | Musslewhite | Nov. 25, 1958 |